United States Patent [19]

Shiseki

[11] 4,209,174
[45] Jun. 24, 1980

[54] SHOCK STARTING TYPE SIMPLIFIED PHONOGRAPH

[76] Inventor: Yutaka Shiseki, 768-1 Shimoaso, Tama-ku, Kawasaki-shi, Kanagawa-ken, Japan

[21] Appl. No.: 43,318

[22] Filed: May 29, 1979

[30] Foreign Application Priority Data

Feb. 28, 1979 [JP] Japan .................................. 54-23104

[51] Int. Cl.² ........................ G11B 3/08; G11B 17/06; G11B 25/04
[52] U.S. Cl. .................................. 274/1 A; 46/117; 46/175 AR
[58] Field of Search ............ 274/1 A; 46/117, 175 AR

[56] References Cited

U.S. PATENT DOCUMENTS

| 3,580,575 | 5/1971 | Speeth | 46/117 |
| 3,588,118 | 6/1971 | Pipa | 274/1 A |
| 3,992,016 | 11/1976 | Watanabe | 274/1 A |

Primary Examiner—Steven L. Stephan
Attorney, Agent, or Firm—Basile and Weintraub

[57] ABSTRACT

A weight means disposed in a casing of a phonograph is capable of being swung and urged normally in a predetermined direction. The weight means is associated with a lifting means. The lifting means is able to mechanically lift a sound transmitting member to move it in a direction away from a record disc against which, said transmitting member is urged under stylus force by means of a stylus force spring.

According to this simple and correct mechanism, the stylus force exerted on the sound transmitting member is released by means of a shock without fail. Hence, a pickup will return to a starting point of sound reproduction by a return spring. The weight means is then able to return to its original location so that the necessary stylus force may be imparted again to the pickup through the sound transmitting member.

6 Claims, 5 Drawing Figures

SHOCK STARTING TYPE SIMPLIFIED PHONOGRAPH

BACKGROUND OF THE INVENTION

I. Field of the Invention

This invention relates to a simplified phonograph capable of being started by a shock imparted thereto. More particularly, the present invention concerns a device into which the simplified phonograph hereof is incorporated. Even more particularly, the present invention concerns a phonograph which is suitable for being incorporated in a toy, such as a laughing bag or a talking doll, and which is capable of generating sounds when any exterior force or shock is imparted to the toy.

II. Description of the Prior Art

Hitherto, simplified phonographs of shock starting type have been provided. These conventional phonographs, generally, can be classified into two major types. First, there is the phonograph wherein a starting lead switch is correlated with a weight means. The other type of phonograph contemplates a link mechanism which is correlated to a weight means.

The first type of phonographs has proven to be not only of somewhat high cost, due to the fact that it necessitates the use of two switch contacts and a complicated weight means construction, but, also, has a considerably delicate lead switch mechanism. Consequently, the first type of phonograph is unsatisfactory as a simplified phonograph for toys due to malfunctions and low acceptance or yield rate.

In case of the second or other type, the link mechanisms of the device are, by their inherent nature complicated and too big to be received in a small casing. Thus, where used, they not only give rise to a cumbersome appearance, but, also, are ineffective. Most important, though, there is great difficulty in incorporating such phonographs into small size toys.

Yet, the mechanical starting system of the second type does display advantageous features, such as, correct and firm function and low production cost. These advantages are suitable for simplified phonographs of the type under consideration.

SUMMARY OF THE INVENTION

The present invention seeks to house a simplified phonograph having a mechanical starting means in a casing and thereby to provide a device having a compact body.

An object of the present invention is to provide a shock starting device of simple construction and low cost.

Another object of the present invention is to provide a shock starting device which does not limit the scope of appropriate application of the simplified phonograph into which the present starting device is incorporated.

According to the present invention, a shock starting simplified phonograph comprises a weight means and a means correlated with said weight means for lifting a sound transmitting member. The weight means, lifting means and transmitting member are installed in a casing. This enables the outside appearance and size of the phonograph utilizing this invention to be entirely the same as that of an ordinary phonograph. Thus, the application of the device of the present invention is not adversely limited, in any respect.

Further, on account of any exterior action, other than the shock exerted from the outside, there exists no possible chance of the device misstarting.

Lifting up of the sound transmitter of the present invention is performed in a merely mechanical manner, and therefore, the device functions very steadily and can be manufactured at a low cost.

For a more complete understanding of the present invention, reference is made to the following detailed description and accompanying drawing. In the drawing, like reference characters refer to like parts throughout the several views, in which:

DETAILED DESCRIPTION OF THE PREFERRED EMBODIMENTS

Figure 1:
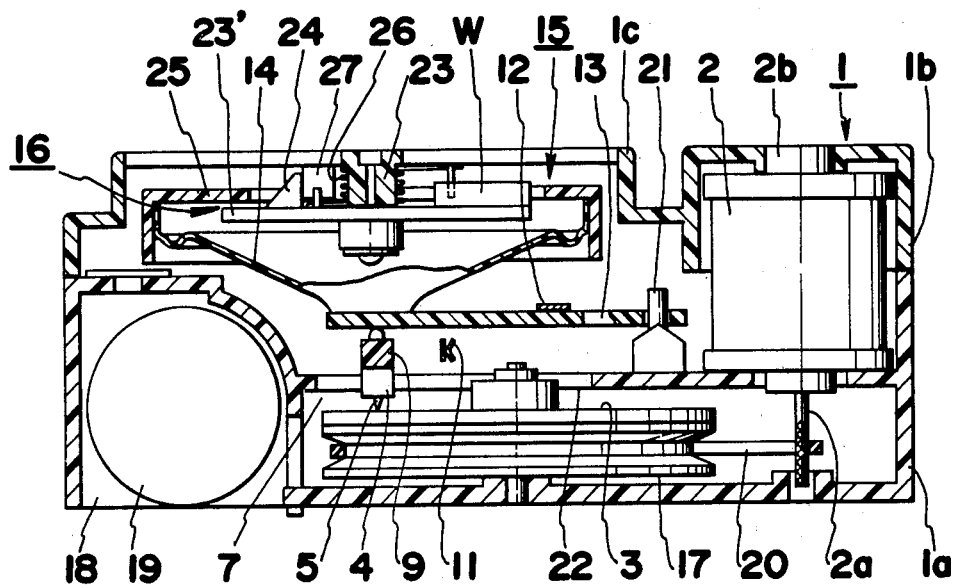
FIG. 1 is a side cross-sectional view of the device of the present invention.
Figure 2:
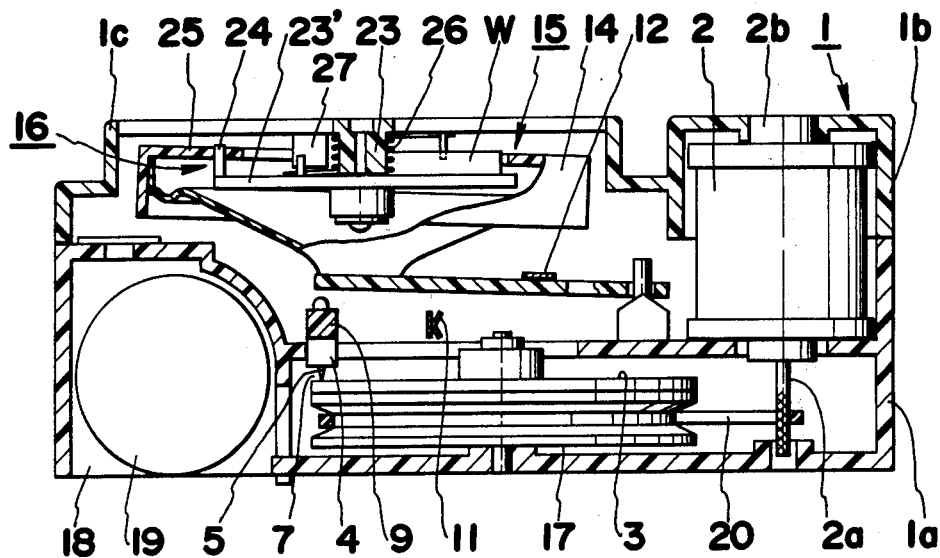
FIG. 2 is a cross-sectional view of the device, similar to FIG. 1, but the lifting means being in the lifted position.

Referring now to the drawing, and as noted above, FIG. 1 depicts a simplified phonograph in cross-section showing the device hereof in the course of sound reproduction and FIG. 2 is similar to FIG. 1, but shows a tone arm in a return mode toward a starting point or position.

As shown in these figures, a casing 1 of a phonograph comprises a chassis 1a and housing 1b. A turn table 17 is rotatably supported on a base plate of the chassis 1a. A record disc 3 rests on the turn table 17.

A battery magazine 18 houses a battery 19. The battery 19 powers the turn table to effectuate movement thereof.

A motor 2 is vertically mounted on a middle deck or plate of the chassis 1a. The motor 2 includes an output shaft 2a which extends downwardly. The output shaft passes over the middle plate, as shown. The motor 2 has an upper bearing for receiving an upper end of the output shaft. The upper bearing is firmly held in the housing 1b, as shown.

The peripheral side of the output shaft 2a is faced with the peripheral side surface of the turn table 17. An endless belt 20, made of a resilient material, is extended between and around the peripheries of the turn table 17 and the output shaft 2a.

A speaker unit 15 is supported at one end thereof above the middle deck of the chassis 1a by a pair of supporting posts 21. The posts 21 extend upwardly from the middle deck.

Figure 4:
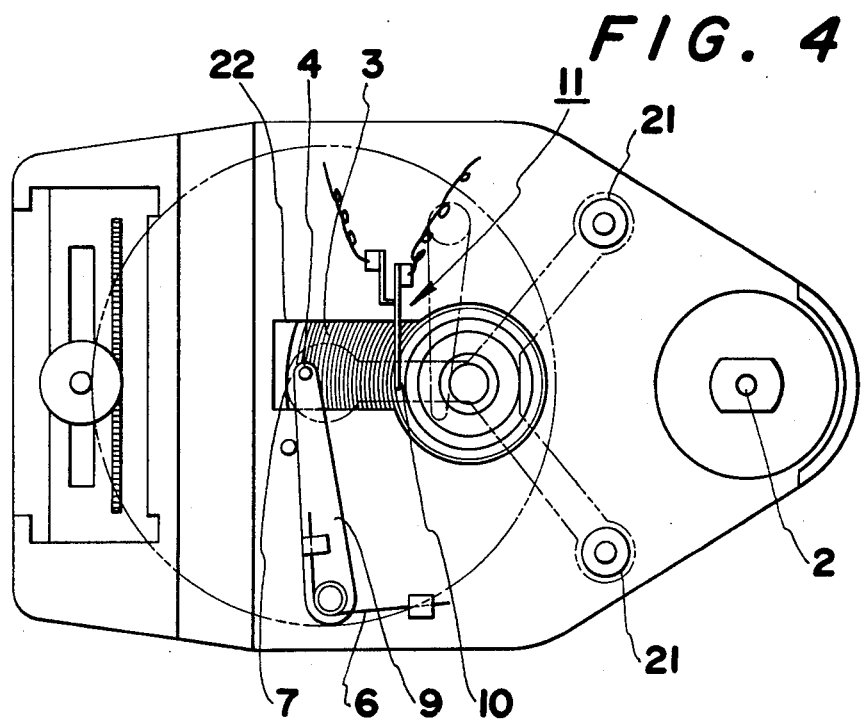
FIG. 4 is a top plan view of the present device with the housing removed.

The speaker unit 15 comprises a sound transmitting member 13 and a speaker 14. One end portion of the sound transmitting member is configured similarly to a bifurcated yoke (FIG. 4). The end portion of the member 13 is supported on the posts 21 at the tip ends of the two arms of the bifurcated yoke. The end portion of the member 13 is, thus, capable of being swung in an upward and downward direction. As shown in FIGS. 1, 2 and 4, the middle deck of the chassis 1a, also, swingably supports thereon a tone arm 9. A pickup 4, which carries a downwardly directed reproduction stylus 5 is carried on the free end of the tone arm. The stylus 5, as shown, is directed toward the record disc 3.

The middle deck has an oblong aperture 22 formed therein along the locus of the swing motion of the pickup 4, so that the reproduction stylus may engage the record disc 3. The pickup 4 extends downward through the aperture 22 to the upper face of the record disc 3. The tone arm 9 is urged, by means of a return spring 6, laterally toward the starting point of reproduction 7 of the record disc 3 and also upwardly toward the speaker unit 15.

The other end part of portion of the sound transmitter 13 of the speaker unit, opposite the bifurcated end supported by the supporting posts 21, detachably rides on the pickup 4 of the tone arm 9. This urges the top of the pickup 4 downward, conjointly with a stylus force spring 12, to the upper face of the record disc 3.

The pickup 4, also, swingably travels during its sound reproduction while being kept in sliding contact with the lower face of the sound transmitter member 13.

As shown in the drawings, an electric switch 11 breaks the electric circuit, when the pickup 4 reaches the terminal or end point of sound reproduction 10, such that the supply of electricity to the motor 2 is cut off. This stops rotation of the record disc 3.

Figure 3:
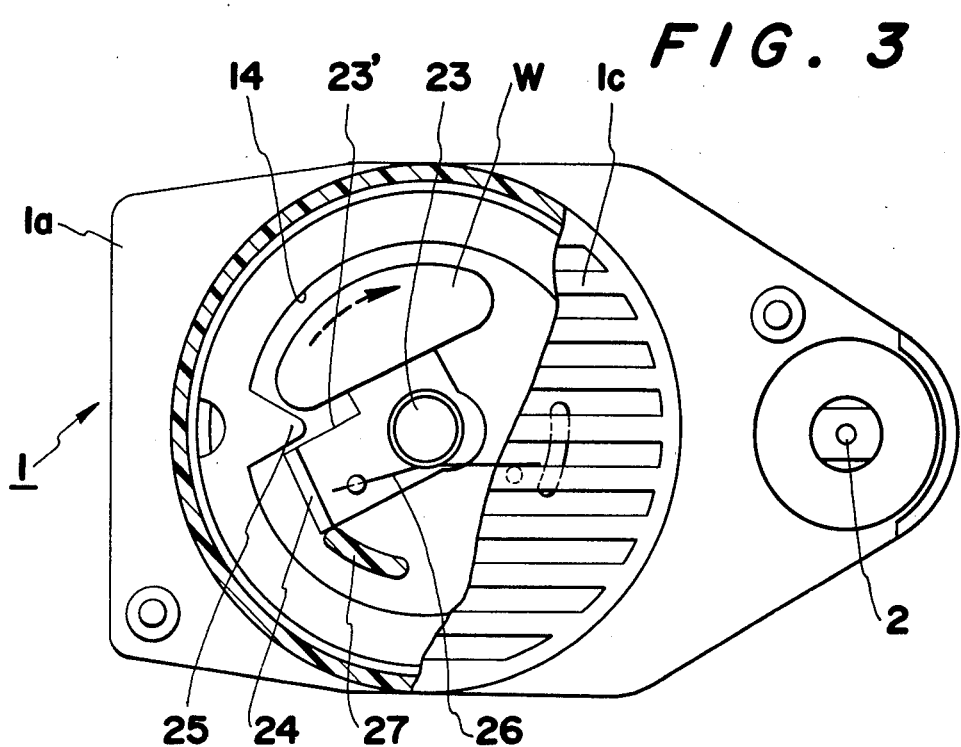
FIG. 3 is a partially cut-away top plan view of the device hereof.

As shown in FIGS. 1 to 3, the housing 1b comprises a speaker housing 1c. Disposed within and substantially centrally of the housing 1c is a weight means W. The weight means W is suspended from the top face of the speaker house 1c and is swingable about a shaft 23. The shaft 23 is disposed on the lower face of the top plate of the speaker house 1c and projects downward up to the interior space of a cone of the speaker 14.

A bracket 23' for supporting the weight means W thereon is attached concentrically about the shaft 23 for relative rotation therebetween. The bracket is configured as a pair of bifurcated arms, as shown in FIG. 3. A tip end of one of the branched arms of the bracket carries the weight means W. The tip end of the other arm carries a cam piece 24, while the upper rim of the arm constitutes a cam surface.

Both the weight means W and the cam piece 24 take their positions upto the inside of a conical cavity defined by the peripheral wall of the speaker 14.

A projection 25 extends radially and inwardly from the top rim of the side wall of the speaker so as to be laid on the locus of the rotational motion of the cam 24 about the shaft 23.

Both the weight means W and the cam piece 24 are resiliently biased by means of a coil spring 26 assembled about the shaft 23 such that the cam is normally prevented from contacting the projection 25 absent any shock tending to move the projection toward the counter direction against the bias exerted upon the device.

A stopper 27 restrains the cam 24 against the resilient force of the coil spring.

In this embodiment of the invention, the cam 24 and the projection 25 comprise a means for lifting the sound transmitting member 13 through the speaker 14.

The lifting action is performed in an entirely mechanical manner without relying on any electrical means.

When an exterior shock of appropriate extent is imparted to this kind of device, the weight means W will swingably rotate in a direction shown by the dot arrow line (FIG. 3) against the resilient force of the spring 26. Then, the cam piece 24, also, will rotate through the motion of the bracket in the same direction.

The rotation of the cam piece 24, caused by the inertial force of the weight means W, will scoop up the projection 25 of the speaker 14. Then, the speaker 14, together with the sound transmitting member 13, is lifted pivotally and raised about the supporting posts 21 against the resilient force imparted by the stylus force spring 12. Thus, the pickup 4 is released from the stylus force given by the spring 12.

Although the pickup 4 is adjusted to hold the switch 11 "OFF", i.e., opened at the terminal point 10 of sound reproduction, the reproduction stylus 5, upon removal of the stylus force, will move upward away from the engagement with the record groove. Then, the pickup 4 will move laterally, by means of the return spring 6, in a direction toward the starting point 7 of sound reproduction. Next, the switch 11 will be closed, since there is no restraining force given by the pickup 4 to keep the two contact blades away from each other. Thus, electricity is supplied to the motor 2 so as to rotate the turn table 17 and record disc 3 carried thereon.

Since the weight means W is always resiliently urged in the same direction by the spring 26, the weight means W and the cam 24 will move back to their initial position where they were positioned before the shock was applied to the device. Consequently, the projection 25 is released from the upward lifting force of the cam piece 24, which, in turn, causes descent of the speaker 14 and the sound transmitter 13 under the downward resilient force of the spring 12 to impart necessary stylus force.

Hence, it becomes possible for the pickup 4 to be imparted with the necessary stylus force at the starting point 7 of sound reproduction and the reproduction stylus 5 is able to engage the recording groove.

In this manner, the starting of sound reproduction can be effected by application of a certain extent of shock to the device.

Figure 5:
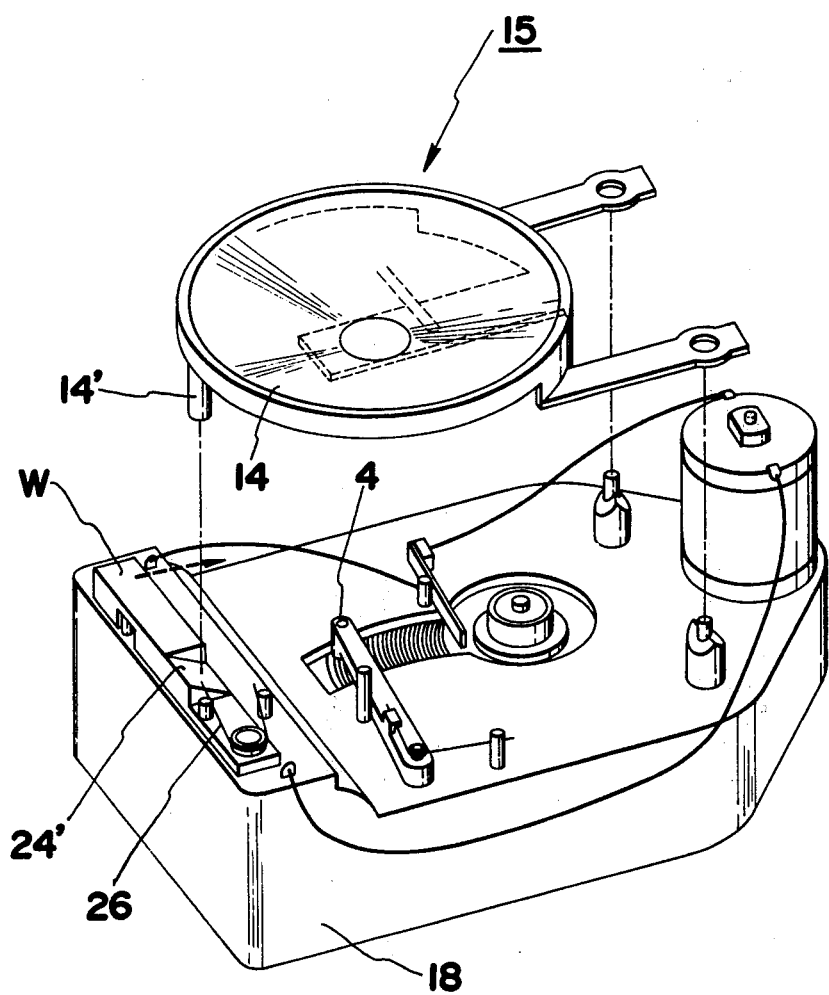
FIG. 5 is an exploded, perspective view of another embodiment of the present invention.

FIG. 5 shows another embodiment of the present invention, wherein a weight means W is swingably mounted on an upper surface of the battery magazine 18.

According to this embodiment, a speaker unit 15 is situated so as to extend over the portion wherein the locus of swing motion of the weight means W is entirely encompassed. The weight means W has, as an integral part thereof, within its locus of swing, an upwardly facing cam surface 24'.

The speaker unit 15 has a downwardly projected portion 14' which at its lower peripheral marginal rim, faces and engages the cam surface 24' such that the cam surface 24' may push up the projected portion 14', when the weight means W is swung in a direction as shown by a dot arrow line in the drawing.

In this manner, the speaker unit 15 is lifted by the movement of the weight means W due to the inertia caused by an applied shock. When the shock occurs the pickup 4 is released from the needle pressure which has been applied thereto.

Other constructions and functions of the device of this embodiment, such as spring 26 attached to the weight means W and so on, are entirely similar in principle to those of the aforesaid embodiment, so further explanation will not be repeated.

In the present embodiment, both the cam surface 24' and the protruding portion 14' at the lower peripheral rim of the speaker constitute the lifting means 16.

Having, thus, described the invention what is claimed is:

1. A shock starting simplified phonograph, comprising:
   (a) a casing,
   (b) a tone arm disposed in the casing,
   (c) a pickup attached to the tone arm,
   (d) a reproduction stylus connected to the pickup,
   (e) means for pivotally mounting the tone arm disposed in casing, the pivot means enabling the tone arm to be swung such that the stylus can trace a rotatable record disc,
   (f) a record disc having a starting point and a terminal point of sound reproduction,
   (g) means for rotating the record disc,
   (h) means for normally urging the tone arm toward the starting point of sound reproduction of the record disc
   (i) means for stopping the means for rotating when the tone arm reaches the terminal point of sound reproduction,
   (j) a speaker unit comprising:
      (1) a sound transmitting member swingably mounted in the casing, the sound transmitting member urging the pickup against the record disc,
      (2) a speaker for converting the vibrations generated by the sound transmitting member into audible sound,
      (3) means for biasing the transmitting member to urge the pickup against the record disc
   (k) a weight, the weight being normally urged in a predetermined direction, the weight being movable in a direction opposite to the predetermined direction in response to a shock imparted the phonograph to enable a starting thereof, and
   (l) a mechanical means for lifting the pickup and cooperating with the weight for returning the pickup to the starting point of sound reproduction against the bias of the sound transmitting member biasing means.

2. The phonograph of claim 1 wherein:
the means for rotating comprises a motor and a source of power for operating the motor.

3. The phonograph of claim 2 wherein:
the source of power comprises a source of electrical energy.

4. The phonograph of claim 3 wherein:
the means for stopping comprises a normally closed switch in electrical communication with the source of energy and the motor, the switch being opened to break electrical communication between the motor and the source by the force of the tone arm upon engagement therewith.

5. A simplified phonograph of shock starting type as claimed in claim 1 wherein:
   (a) the weight means is disposed in proximity to a front face of the speaker, the weight being capable of being swung laterally in the two opposite directions,
   (b) the sound transmitting member and the speaker comprise an integrally formed speaker unit,
   (c) the lifting means comprises:
      (1) an upwardly facing cam piece movable in two opposite directions and
      (2) a projection provided at peripheral rim of said speaker, the projection extending on the locus of the swing motion of said cam piece,
   (d) the phonograph further comprising a turn table onto which the record disc is mounted, and
   wherein the cam piece is movable along and over the turn table.

6. A shock starting simplified phonograph as claimed in claim 1 wherein:
   (a) the weight means is swingably disposed such that it may liftingly scoop up the speaker at one side edge thereof,
   (b) the sound transmitter and said speaker are assembled together to define an integral unit; and
   (c) the lifting means comprises:
      (1) an upwardly facing cam face disposed on said weight means and
      (2) a part of a lower peripheral rim of said speaker.

* * * * *

UNITED STATES PATENT OFFICE
CERTIFICATE OF CORRECTION

Patent No. 4,209,174  Dated June 24, 1980

Inventor(s) Yutaka Shiseki

It is certified that error appears in the above-identified patent and that said Letters Patent are hereby corrected as shown below:

On the title page add:

-- Assignee:  Ozen Corporation
              Tokyo, Japan --.

Signed and Sealed this

Thirtieth Day of April 1985

[SEAL]

Attest:

DONALD J. QUIGG

Attesting Officer     Acting Commissioner of Patents and Trademarks